Patented Aug. 14, 1934

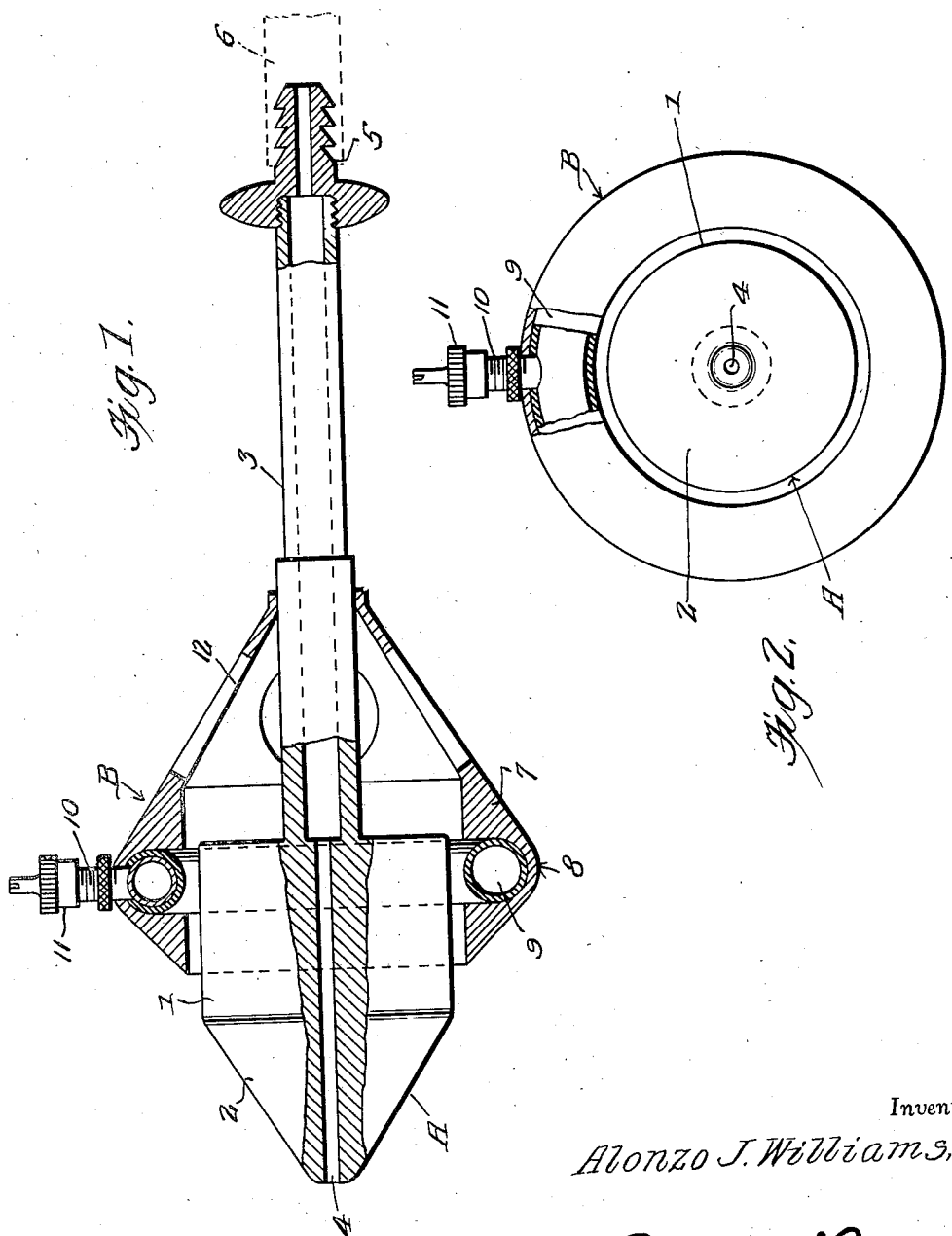

1,969,831

UNITED STATES PATENT OFFICE 1,969,831

SYRINGE FOR USE BY VETERINARIES

Alonzo Jedson Williams, McLoud, Okla.

Application April 19, 1934, Serial No. 721,410

2 Claims. (Cl. 128—239)

This invention relates to an instrument for use by veterinaries, the general object of the invention being to provide means for giving cattle and other stock enemas.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a longitudinal sectional view, with parts in elevation and parts broken away.

Figure 2 is an end view with parts broken away.

In this drawing, the letter A indicates a plunger which includes a cylindrical part 1, the conical end 2 and the hollow stem 3, the head having a bore 4 therein which communicates with the bore of the stem and passes through the pointed end of the conical part and a nipple 5 is threaded to the free end of the stem and is adapted to have a hose 6, shown in dotted lines in Figure 1, attached thereto so that water or other liquid can pass through the bore. A member B surrounds a portion of the plunger and has its front end of ring shape, as shown at 7, and of larger internal diameter than the external diameter of the part 1, this ring being thickened so that a groove 8 can be formed in its inner circumference to receive a pneumatic tube 9 which is provided with a valve stem 10 having the usual valve therein and which is threaded to receive a cap 11. The outer part of the member B is of conical shape, with its small end open to receive a part of the stem and this part has the openings 12 therein.

In using the device, the head, composed of the parts 1 and 2, is inserted to a considerable extent into the rectum and then the plunger is pulled outwardly until there is sufficient protrusion of the rectum to permit the ring-shaped part of the member B to slip over the protruding part so that this protruding part lies between the part 1 of the head and the ring-shaped part 7. Then the tube 9 is inflated so that the tube will clamp the protruding part between itself and the part 1 and thus the syringe will be attached to the rectum. The water or other liquid is then passed through the hose and through the stem and the bore 4 into the rectum. If desired, a pressure pump can be used to force water through the device.

When the device is to be removed, it is simply necessary to depress the valve in the stem 10 so as to permit the air to escape from the tube 9 and then the device can be removed.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:

1. A syringe device for veterinary work comprising a plunger including a head and a hollow stem, the head having a bore passing therethrough in communication with the bore of the stem, a member surrounding and spaced from the head and longitudinally slidable on the stem, said member having an annular groove therein in a plane at right angles to the head and stem, and an inflatable resilient tube in the groove for clamping a part of the animal between itself and the head.

2. A syringe of the class described comprising a head including a cylindrical portion and a conical end portion, a hollow stem connected to the head, said head having a bore therein passing from the pointed end thereof to the bore of the stem, a hollow member through which the stem and head pass in spaced relation, said member having an annular groove in a plane at right angles to the head and stem, a tube of resilient material carried by the front end of said member, and means for inflating the tube for clamping a portion of an animal between the tube and the cylindrical part of the head.

ALONZO JEDSON WILLIAMS.